(12) United States Patent
Huang et al.

(10) Patent No.: US 10,788,454 B2
(45) Date of Patent: Sep. 29, 2020

(54) METHOD AND DEVICE FOR IDENTIFYING DEFECT OPENING PROFILE

(71) Applicants: Hubei University of Technology, Wuhan, Hubei (CN); Tsinghua University, Beijing (CN)

(72) Inventors: Songling Huang, Beijing (CN); Xiaochun Song, Hubei (CN); Lisha Peng, Beijing (CN); Wei Zhao, Beijing (CN); Shen Wang, Beijing (CN); Xinjie Yu, Beijing (CN); Shisong Li, Beijing (CN)

(73) Assignees: HUBEI UNIVERSITY OF TECHNOLOGY, Wuhan, Hubei (CN); TSINGHUA UNIVERSITY, Beijing (CN)

( * ) Notice: Subject to any disclaimer, the term of this patent is extended or adjusted under 35 U.S.C. 154(b) by 225 days.

(21) Appl. No.: 16/044,590

(22) Filed: Jul. 25, 2018

(65) Prior Publication Data
US 2019/0049409 A1  Feb. 14, 2019

(30) Foreign Application Priority Data
Aug. 11, 2017  (CN) .......................... 2017 1 0686539

(51) Int. Cl.
*G01N 27/83* (2006.01)

(52) U.S. Cl.
CPC .................................. *G01N 27/83* (2013.01)

(58) Field of Classification Search
CPC ............................................ G01N 27/82–9093
USPC ......................................... 324/216, 239–243
See application file for complete search history.

(56) References Cited

U.S. PATENT DOCUMENTS

2011/0037461 A1* 2/2011 Braun .................... G01N 27/87
324/240

\* cited by examiner

*Primary Examiner* — Nasima Monsur
*Assistant Examiner* — Rahul Maini
(74) *Attorney, Agent, or Firm* — Hodgson Russ LLP

(57) ABSTRACT

A method for identifying a defect opening profile includes: acquiring a vertical component of a magnetic flux leakage signal of a defect; identifying right-angle features and corresponding right-angle position points of the defect from the vertical component; obtaining all possible right-angle types at each right-angle position point of the defect according to the corresponding right-angle feature of the vertical component; traversing all the possible right-angle types at each right-angle position point to determine respective optimal right-angle type at each right-angle position point; and drawing the defect opening profile according to the respective optimal right-angle type at each right-angle position point.

16 Claims, 11 Drawing Sheets

| right-angle feature | right-angle type | | | |
|---|---|---|---|---|
| first right-angle feature | ⌐ | ⌡ | ⌊ | ⌐ |
| second right-angle feature | ⌐ | ⌊ | ⌐ | ⌐ |

US 10,788,454 B2

1

METHOD AND DEVICE FOR IDENTIFYING DEFECT OPENING PROFILE

CROSS-REFERENCE TO RELATED APPLICATION

This application claims priority to and benefits of Chinese Patent Application Serial No. 201710686539.0, filed with the State Intellectual Property Office of P. R. China on Aug. 11, 2017, the entire content of which is incorporated herein by reference.

FIELD

The present disclosure relates to the field of magnetic flux leakage testing, and more particularly to a method and device for identifying a defect opening profile.

BACKGROUND

Defect opening profile identification is a key part of the magnetic flux leakage testing technique and plays an important role in a defect assessment. A magnetic flux leakage signal is characterized by a three-dimensional magnetic flux leakage signal which includes a horizontal component, a normal component, and a vertical component. Compared with the horizontal component and the normal component of the magnetic flux leakage signal, the signal intensity of the vertical component is weaker, by which it is difficult to intuitively reflect a defect boundary. Therefore, the vertical component is seldom used alone in magnetic flux leakage testing and defect opening profile identification. At present, commonly used magnetic flux leakage testing solutions and defect opening profile identification methods are researched mostly based on the horizontal component or the normal component of the magnetic flux leakage signal. However, the vertical component of the magnetic flux leakage signal has a high detection sensitivity to right angles of a defect and has different signal features for different right-angle types of the defect. Based on these characteristics, the vertical component of the magnetic flux leakage signal can be used to analyze the right-angle type of the defect, so as to further realize the defect opening profile identification, which is of great significance for fully mining and utilizing the vertical component information of the magnetic flux leakage signal and realizing accurate positioning and identification of the right-angle feature of the defect. At present, there is no method to realize the defect opening profile identification using the right-angle feature information of the vertical component of the magnetic flux leakage signal.

SUMMARY

The present disclosure seeks to solve at least one of the problems that exist in the related art to at least some extent.

For this, according to a first aspect of embodiments of the present disclosure, a method for identifying a defect opening profile is provided, the method includes:

acquiring a vertical component of a magnetic flux leakage signal of a defect;

identifying right-angle features and corresponding right-angle position points of the defect from the vertical component;

obtaining all possible right-angle types at each right-angle position point of the defect according to the corresponding right-angle feature of the vertical component;

traversing all the possible right-angle types at each right-angle position point to determine respective optimal right-angle type at each right-angle position point; and drawing the defect opening profile according to the respective optimal right-angle type at each right-angle position point.

According to a second aspect of embodiments of the present disclosure, a device for identifying a defect opening profile is provided, the device includes: a processor; and a memory for storing instructions executable by the processor; in which the processor is configured to perform the method for identifying a defect opening profile as described above.

According to a third aspect of embodiments of the present disclosure, there is provided a non-transitory computer-readable storage medium having stored therein instructions that, when executed by a processor of a terminal, causes the terminal to perform the method for identifying a defect opening profile as described above.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 17b is a side view of the magnetic flux leakage testing system shown in FIG. 17a;

FIG. 17c is a side view of the magnetic flux leakage testing system shown in FIG. 17a; and FIG. 17d is a top view of the magnetic flux leakage testing system shown in FIG. 17a.

DETAILED DESCRIPTION

Figure 1:
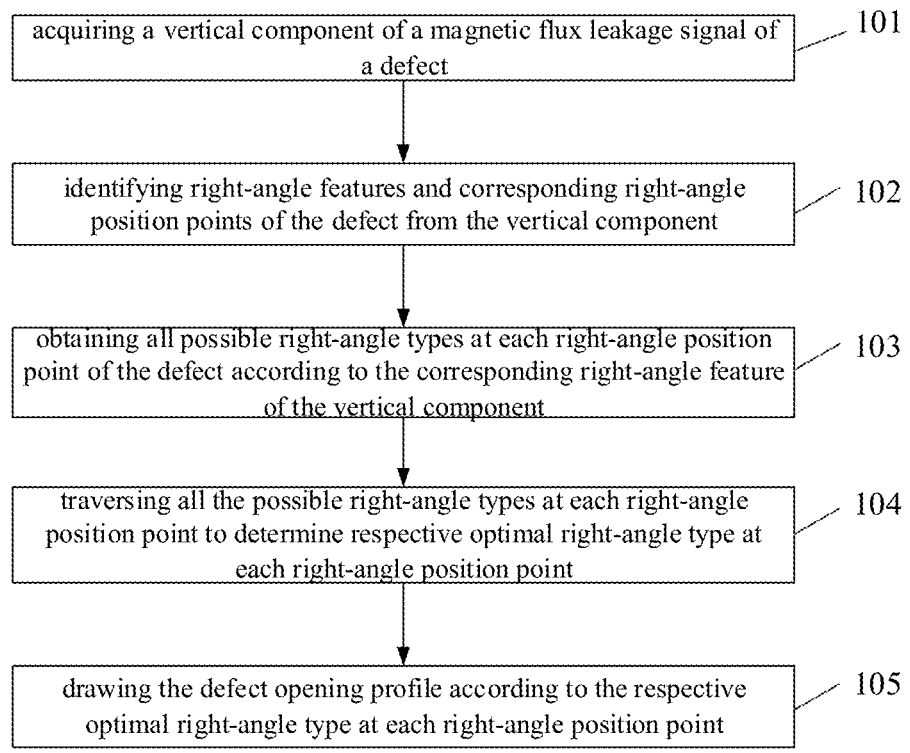
FIG. 1 is a flow chart of a method for identifying a defect opening profile according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

According to a first aspect of embodiments of the present disclosure, a method for identifying a defect opening profile is provided, the method includes:

acquiring a vertical component of a magnetic flux leakage signal of a defect;

identifying right-angle features and corresponding right-angle position points of the defect from the vertical component;

obtaining all possible right-angle types at each right-angle position point of the defect according to the corresponding right-angle feature of the vertical component;

traversing all the possible right-angle types at each right-angle position point to determine respective optimal right-angle type at each right-angle position point; and drawing the defect opening profile according to the respective optimal right-angle type at each right-angle position point.

In embodiments of the present disclosure, traversing all the possible right-angle types at each right-angle position point to determine respective optimal right-angle type at each right-angle position point includes:

performing permutation and combination on the possible right-angle types at the right-angle position points;

establishing geometric topological graphs of the defect according to results of the permutation and combination;

traversing all the geometric topological graphs;

selecting a geometric topological graph with a maximum closed area as an optimal geometric topological graph; and determining respective right-angle type at each right-angle position point of the optimal geometric topological graph as the respective optimal right-angle type at each right-angle position point of the defect.

In embodiments of the present disclosure, the right-angle feature includes a first right-angle feature and a second right-angle feature;

the first right-angle feature includes four right-angle types having opening angles of from 0° to 90°, from 0° to 270°, from 180° to 270°, and from 180° to 90°, respectively; and the second right-angle feature includes four right-angle types having opening angles of from 90° to 180°, from 270° to 360°, from 270° to 180°, and from 90° to 360°, respectively, and the opening angles are acquired by a clockwise rotation from a magnetization direction of the defect.

In embodiments of the present disclosure, before identifying right-angle features and corresponding right-angle position points of the defect from the vertical component, the method further includes:

determining an identification mode from an artificial identification mode and an automatic identification mode for analyzing the vertical component;

determining the right-angle features and the right-angle position points of the defect according to observation of the vertical component if the artificial identification mode is determined as the identification mode; or determining the right-angle features and the right-angle position points of the defect according to closed envelope curves of the vertical component if the automatic identification mode is determined as the identification mode.

In embodiments of the present disclosure, if the artificial identification mode is determined as the identification mode, determining the right-angle features and the right-angle position points of the defect includes:

observing the vertical component;

determining the right-angle feature to be a first right-angle feature if a crest signal protruded upward markedly is observed in the vertical component and an isohypse of the crest is substantially circular, and accordingly, determining a position corresponding to a maximum value of the crest signal as the right-angle position point; or determining the right-angle feature to be a second right-angle feature if a valley signal concaved downward markedly is observed in the vertical component and an isohypse of the valley is substantially circular, and accordingly, determining a position corresponding to a minimum value of the valley signal as the right-angle position point.

In embodiments of the present disclosure, if the automatic identification mode is determined as the identification mode, determining the right-angle features and the right-angle position points of the defect includes:

acquiring a closed envelope curve of the right-angle feature of the vertical component;

analyzing an amplitude of the closed envelope curve of the right-angle feature and judging whether the amplitude of the closed envelope curve of the right-angle feature is greater or less than zero;

determining the right-angle feature to be a first right-angle feature and a position corresponding to a maximum value of the amplitude of the closed envelope curve of the right-angle feature as the right-angle position point if the amplitude of the closed envelope curve of the right-angle feature is greater than zero; and determining the right-angle feature to be a second right-angle feature and a position corresponding to a minimum value of the amplitude of the closed envelope curve of the right-angle feature as the right-angle position point if the amplitude of the closed envelope curve of the right-angle feature is less than zero.

In embodiments of the present disclosure, acquiring a closed envelope curve of the right-angle feature of the vertical component includes:

performing a gray processing on the vertical component to acquire a grayscale image of the vertical component;

performing a canny edge detection on the grayscale image to acquire closed envelope curves of the vertical component;

calculating an ellipticity for each closed envelope curve of the vertical component;

determining for each closed envelope curve of the vertical component whether the ellipticity is less than a preset threshold, if yes, determining the corresponding closed envelope curve as the closed envelope curve of the right-angle feature of the vertical component.

The ellipticity is defined as a ratio of a major axis distance to a minor axis distance of the closed envelope curve.

In embodiments of the present disclosure, the vertical component is a component of the magnetic flux leakage signal of the defect in a direction perpendicular to the magnetization direction on a detection plane, and the detection plane is a scan plane of a magnetic sensor array.

According to a second aspect of embodiments of the present disclosure, a device for identifying a defect opening profile is provided, the device includes: a processor; and a memory for storing instructions executable by the processor; in which the processor is configured to perform the method for identifying a defect opening profile as described above.

According to a third aspect of embodiments of the present disclosure, there is provided a non-transitory computer-readable storage medium having stored therein instructions that, when executed by a processor of a terminal, causes the terminal to perform the method for identifying a defect opening profile as described above.

According to a fourth aspect of embodiments of the present disclosure, there is provided an apparatus for identifying a defect opening profile, including:

an acquiring module configured to acquire a vertical component of a magnetic flux leakage signal of a defect;

an identifying module configured to identify right-angle features and corresponding right-angle position points of the defect from the vertical component;

an obtaining module configured to obtain all possible right-angle types at each right-angle position point of the defect according to the corresponding right-angle feature of the vertical component;

a traversing module configured to traverse all the possible right-angle types at each right-angle position point to determine respective optimal right-angle type at each right-angle position point; and a drawing module configured to draw the defect opening profile according to the respective optimal right-angle type at each right-angle position point.

In embodiments of the present disclosure, the traversing module is configured to:

perform permutation and combination on the possible right-angle types at the right-angle position points;

establish geometric topological graphs of the defect according to results of the permutation and combination;

traverse all the geometric topological graphs;

select a geometric topological graph with a maximum closed area as an optimal geometric topological graph; and determine respective right-angle type at each right-angle position point of the optimal geometric topological graph as the respective optimal right-angle type at each right-angle position point of the defect.

In the following, a method and device for identifying a defect opening profile according to embodiments of the present disclosure are described with reference to the accompanying drawings.

FIG. 1 is a flow chart of a method for identifying a defect opening profile according to an embodiment of the present disclosure. As shown in FIG. 1, the method includes operations illustrated at blocks of FIG. 1.

At block 101, a vertical component of a magnetic flux leakage signal of a defect is acquired.

Figure 2:
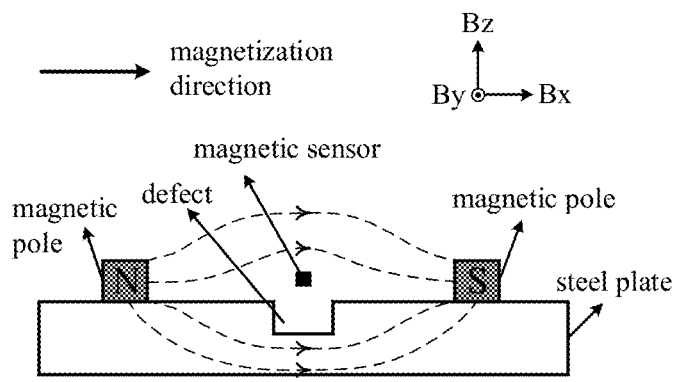
FIG. 2 is a front view showing exemplary three-dimensional magnetic flux leakage testing according to an embodiment of the present disclosure.
Figures 3, 4:
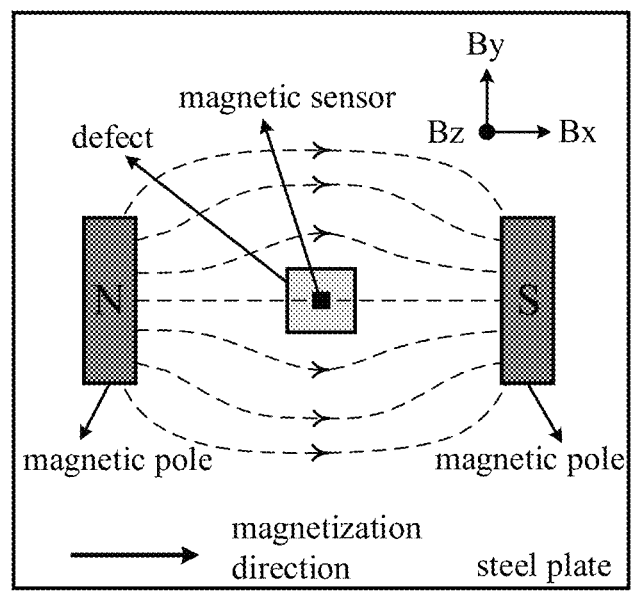
FIG. 3 is a top view showing exemplary three-dimensional magnetic flux leakage testing according to an embodiment of the present disclosure.
FIG. 4 is a schematic diagram showing exemplary right-angle features and corresponding right-angle types according to an embodiment of the present disclosure.

FIG. 2 is a front view showing exemplary three-dimensional magnetic flux leakage testing according to an embodiment of the present disclosure; FIG. 3 is a top view showing exemplary three-dimensional magnetic flux leakage testing according to an embodiment of the present disclosure.

Referring to FIGS. 2 and 3, Bx represents a horizontal component of the magnetic flux leakage signal; By represents a vertical component of the magnetic flux leakage signal; and Bz represents a normal component of the magnetic flux leakage signal. In embodiments of the present disclosure, a detection plane is a scan plane of a magnetic sensor array, the vertical component By is a component of the magnetic flux leakage signal of the defect in a direction perpendicular to a magnetization direction on the detection plane, and a signal intensity distribution of the acquired vertical component of the magnetic flux leakage signal of a defect may be seen from such as FIG. 9.

At block 102, right-angle features and corresponding right-angle position points of the defect are identified from the vertical component.

Specifically, to determine a complete defect, it is needed to determine the right-angle features and specific positions of right angles (i.e., the right-angle position points) of the defect. For example, in embodiments of the present disclosure, the right-angle feature includes a first right-angle feature and a second right-angle feature, the first right-angle feature includes such as four right-angle types, and the second right-angle feature includes such as four right-angle types. Before the right-angle feature at each of the right-angle position points is determined, there are 8 possible right-angle types at each of the right-angle position points. Of course, if the right-angle feature at each of the right-angle position points is determined, there are 4 possible right-angle types at each of the right-angle position points, and thus a speed to determine respective optimal right-angle types at the right-angle position points will be quicken.

FIG. 4 is a schematic diagram showing exemplary right-angle features and corresponding right-angle types according to an embodiment of the present disclosure. Referring to FIG. 4, the right-angle feature includes the first right-angle feature and the second right-angle feature.

The first right-angle feature includes four right-angle types having opening angles of from 0° to 90°, from 0° to 270°, from 180° to 270°, and from 180° to 90°, respectively.

The second right-angle feature includes four right-angle types having opening angles of from 90° to 180°, from 270° to 360°, from 270° to 180°, and from 90° to 360°, respectively.

It should be noted that, one right-angle side of each of the above right-angle types is parallel to the magnetization direction of the magnetic flux leakage testing, and the other right-angle side of each of the above right-angle types is perpendicular to the magnetization direction of the magnetic flux leakage testing. The opening angles of the above right-angle types are acquired by a clockwise rotation from the magnetization direction.

At block 103, all possible right-angle types at each right-angle position point of the defect are obtained according to the corresponding right-angle feature of the vertical component.

For example, if a right-angle feature at a certain right-angle position point is determined to be the first right-angle feature, the possible right-angle types at this right-angle position point may be right-angles having opening angles of from 0° to 90°, from 0° to 270°, from 180° to 270°, and from 180° to 90°, respectively, i.e., there are 4 possible right-angle types at this right-angle position point; similarly, if a right-angle feature at a certain right-angle position point is determined to be the second right-angle feature, the possible right-angle types at this right-angle position point may be right-angles having opening angles of from 90° to 180°, from 270° to 360°, from 270° to 180°, and from 90° to 360°, respectively, i.e., there are 4 possible right-angle types at this right-angle position point.

At block 104, all the possible right-angle types at each right-angle position point are traversed to determine respective optimal right-angle type at each right-angle position point.

Figure 5:
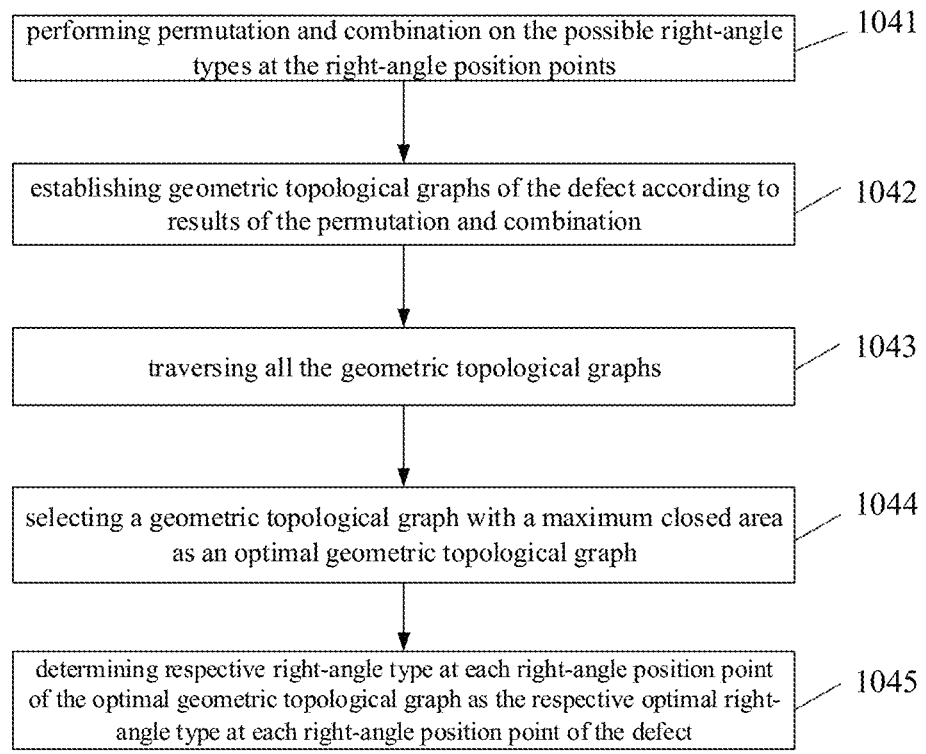
FIG. 5 is a flow chart of an operation illustrated at block 104 of FIG. 1 according to an embodiment of the present disclosure.

In an implementation, the operation at block 104 includes operations illustrated at blocks of FIG. 5.

At block 1041, permutation and combination is performed on the possible right-angle types at the right-angle position points.

At block 1042, geometric topological graphs of the defect are established according to results of the permutation and combination.

Figure 6:
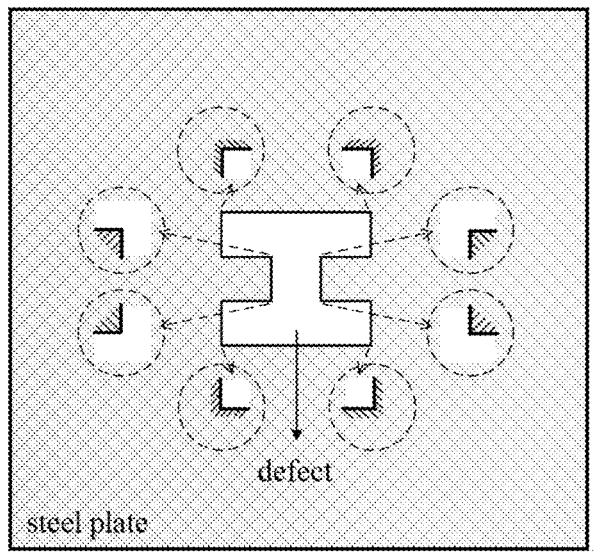
FIG. 6 is a schematic diagram showing an exemplary defect combined by different right-angle types according to an embodiment of the present disclosure.

FIG. 6 is a schematic diagram showing an exemplary defect combined by different right-angle types according to an embodiment of the present disclosure. Taking the defect shown in FIG. 6 as an example, the defect needed to be detected includes eight right-angle position points. Through the identification at block 102, respective right-angle features at the eight right-angle position points are acquired, and each right-angle position point corresponds to four possible right-angle types. After the permutation and combination, $4^8$ combinations are obtained, based on which, the geometric topological graphs of the defect are established.

At block 1043, all the geometric topological graphs are traversed.

At block 1044, a geometric topological graph with a maximum closed area is selected as an optimal geometric topological graph.

At block 1045; respective right-angle type at each right-angle position point of the optimal geometric topological graph is determined as the respective optimal right-angle type at each right-angle position point of the defect.

For example, for the exemplary defect shown in FIG. 6, all the geometric topological graphs of the $4^8$ combinations are traversed, from which those geometric topological graphs with a closed area (i.e., a closed defect is combined by respective right-angle types at the eight right-angle position points) are selected, among which a geometric topological graph with a maximum closed area is determined as an optimal geometric topological graph, and the respective right-angle types at the eight right-angle position points of the optimal geometric topological graph obtained thereby are determined as the respective optimal right-angle types at the right-angle position points of the defect.

At block 105, the defect opening profile is drawn according to the respective optimal right-angle type at each right-angle position point.

Specifically, since the respective optimal right-angle types at the right-angle position points can be combined into a closed defect, a defect opening profile may certainly be drawn according to the respective optimal right-angle types at the right-angle position points, thereby achieving the identification of the defect opening profile.

With the method for identifying a defect opening profile according to embodiments of the present disclosure, the vertical component of a magnetic flux leakage signal of a defect is acquired; right-angle features and corresponding right-angle position points of the defect are identified from the vertical component; all possible right-angle types at each right-angle position point of the defect are obtained according to the corresponding right-angle feature of the vertical component; all the possible right-angle types at each right-angle position point are traversed to determine respective optimal right-angle type at each right-angle position point; and the defect opening profile is drawn according to the respective optimal right-angle type at each right-angle position point. With the method of the present disclosure, the defect opening profile identification is realized with good identification effect by performing calculation and analysis only on the vertical component of the magnetic flux leakage signal, determining the right-angle feature at each right-angle position point of the defect and traversing the geometric topological graphs, etc. Moreover, the method of the present disclosure is simple and has a high identification rate for the right angles of the defect, and thus provides effective and accurate information on the right-angle features of the defect for defect opening profile identification based on the three-dimensional magnetic flux leakage signal.

Figure 7:
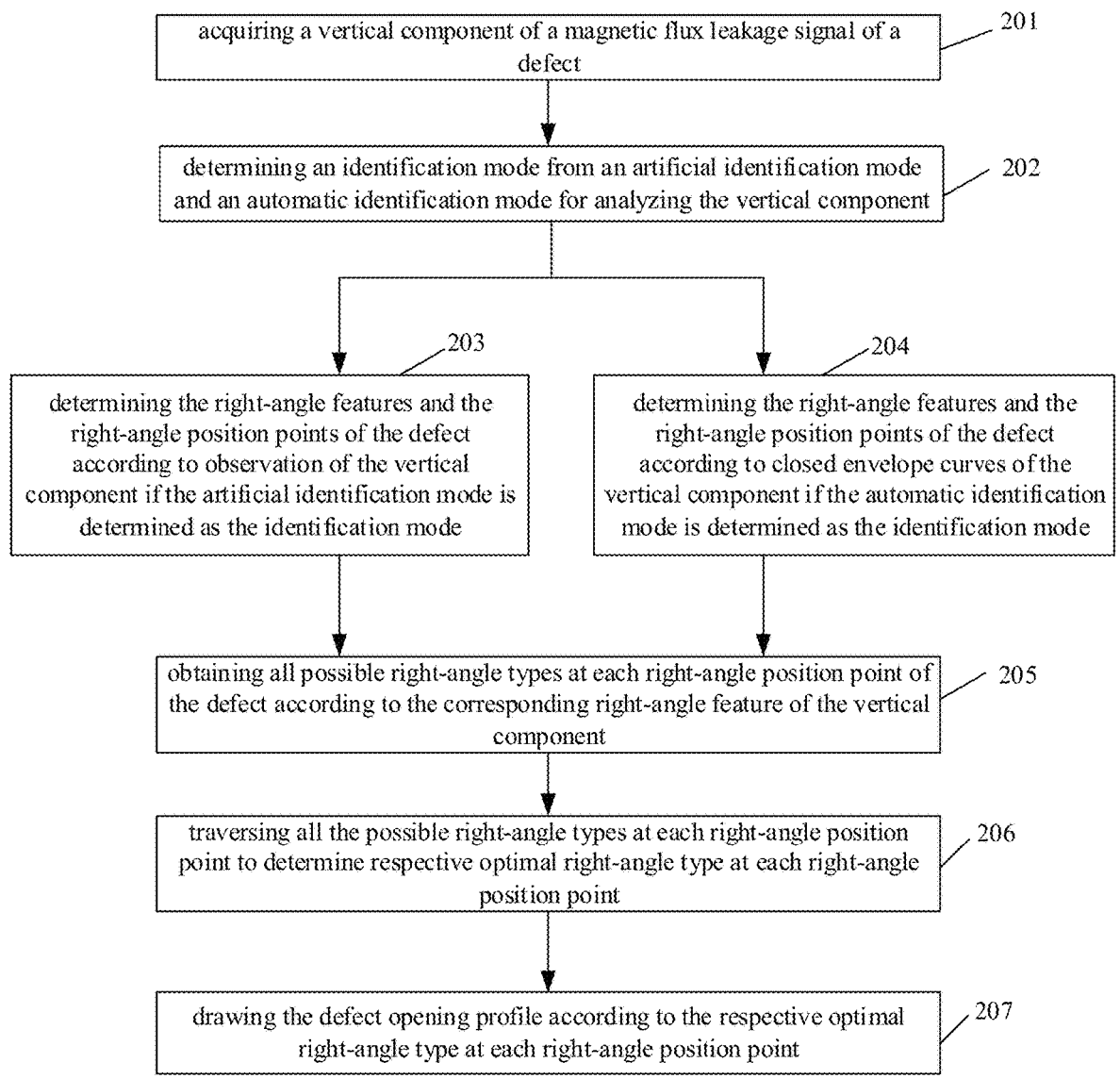
FIG. 7 is a flow chart of a method for identifying a defect opening profile according to an embodiment of the present disclosure.

FIG. 7 is a flow chart of a method for identifying a defect opening profile according to an embodiment of the present disclosure. Before identifying right-angle features and corresponding right-angle position points of the defect from the vertical component, the method further includes: determining an identification mode from an artificial identification mode and an automatic identification mode for analyzing the vertical component; determining the right-angle features and the right-angle position points of the defect according to observation of the vertical component if the artificial identification mode is determined as the identification mode; or determining the right-angle features and the right-angle position points of the defect according to closed envelope curves of the vertical component if the automatic identification mode is determined as the identification mode.

As shown in FIG. 7, the method for identifying a defect opening profile according to embodiments of the present disclosure includes operations illustrated at blocks of FIG. 7.

At block 201, a vertical component of a magnetic flux leakage signal of a defect is acquired.

The implementation of the operation at block 201 is same as the implementation of the operation at block 101 as described above, which will not be elaborated herein.

At block 202, an identification mode for identifying the vertical component is determined from an artificial identification mode and an automatic identification mode; if the artificial identification mode is determined as the identification mode, an operation at block 203 is executed; if the automatic identification mode is determined as the identification mode, an operation at block 204 is executed.

Specifically, the artificial identification mode mainly relies on experiences of those skilled in the related art through long-term experiments to identify the right angle of the defect from the vertical component of the magnetic flux leakage signal. The automatic identification mode identifies the right angle of the defect from the vertical component of the magnetic flux leakage signal according to a set rule, without relying on the experiences of those skilled in the related art.

At block 203, the right-angle features and the right-angle position points of the defect are determined according to observation of the vertical component, and then operation at block 205 is executed.

Figure 8:
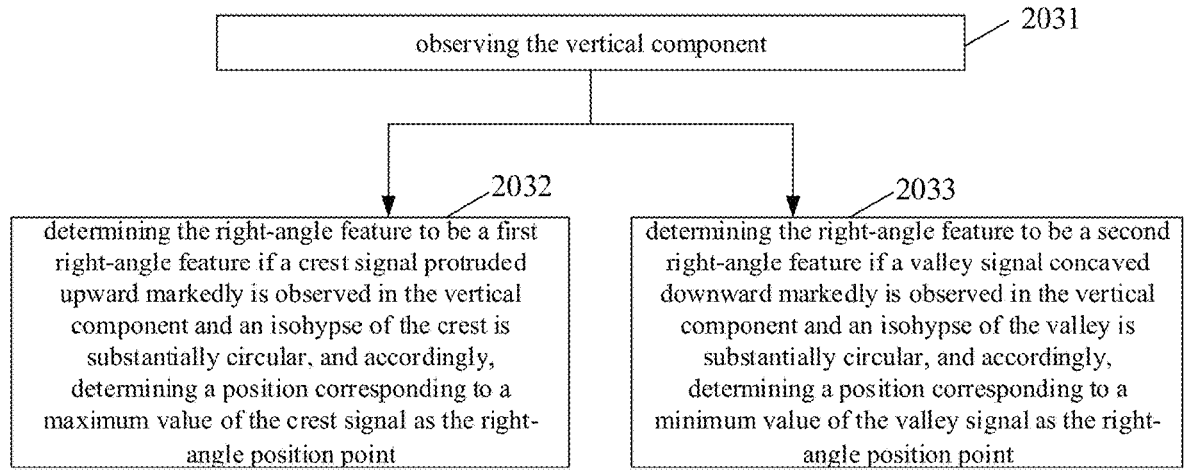
FIG. 8 is a flow chart of an operation illustrated at block 203 of FIG. 7 according to an embodiment of the present disclosure.

In an implementation, the operation at block 203 includes operations illustrated at the blocks of FIG. 8.

At block 2031, the vertical component is observed.

At block 2032, if a crest signal protruded upward markedly is observed in the vertical component and an isohypse of the crest is substantially circular, the right-angle feature is determined to be a first right-angle feature, and accordingly, a position corresponding to a maximum value of the crest signal is determined as the right-angle position point.

At block 2033, if a valley signal concaved downward markedly is observed in the vertical component and an isohypse of the valley is substantially circular, the right-angle feature is determined to be a second right-angle feature, and accordingly, a position corresponding to a minimum value of the valley signal is determined as the right-angle position point.

At block 204, the right-angle features and the right-angle position points of the defect are determined according to closed envelope curves of the vertical component, and then operation at block 205 is executed.

An example is provided here to explain the method for identifying a defect opening profile where the artificial identification mode is used to identify the vertical component of the magnetic flux leakage signal.

Figure 9:
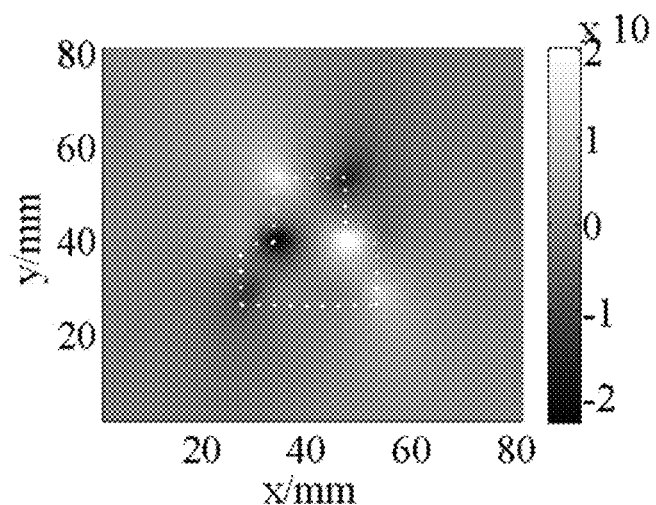
FIG. 9 is a schematic diagram showing a signal intensity distribution of a vertical component of a magnetic flux leakage signal of a defect in three-dimensional magnetic flux leakage testing according to an embodiment of the present disclosure.

FIG. 9 is a schematic diagram showing a signal intensity distribution of a vertical component of a magnetic flux leakage signal of a defect in exemplary three-dimensional magnetic flux leakage testing according to an embodiment of the present disclosure. The dotted line in FIG. 9 gives the original opening profile of the defect.

Figure 10:
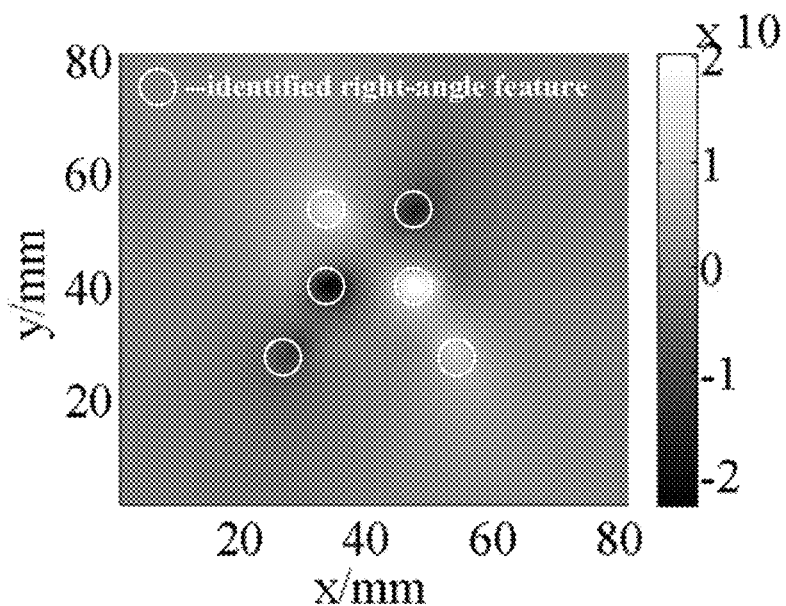
FIG. 10 is a schematic diagram showing identified right-angle features of a defect based on an artificial identification mode.

FIG. 10 shows identified right-angle features of the defect based on an artificial identification mode. From the FIG. 10, it can be seen that six right-angle features of a vertical component of a magnetic flux leakage signal of a defect have been determined.

Figure 11:
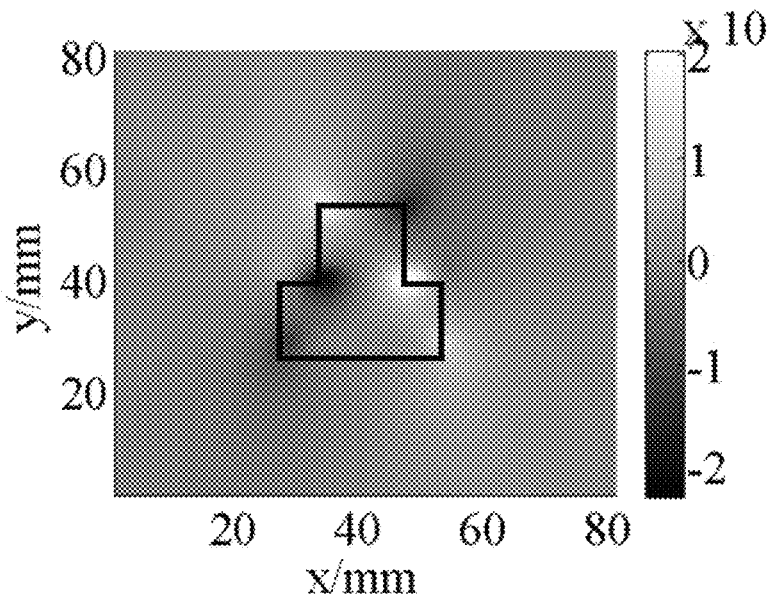
FIG. 11 is a schematic diagram showing an identification result of a defect according to an embodiment of the present disclosure.

FIG. 11 is a schematic diagram showing an identification result of a defect according to an embodiment of the present disclosure. The solid line in FIG. 11 shows the identified opening profile of the defect. As can be seen from FIG. 11, the method for identifying the defect opening profile based on the vertical component of the magnetic flux leakage signal has a good identification effect.

Figure 12:
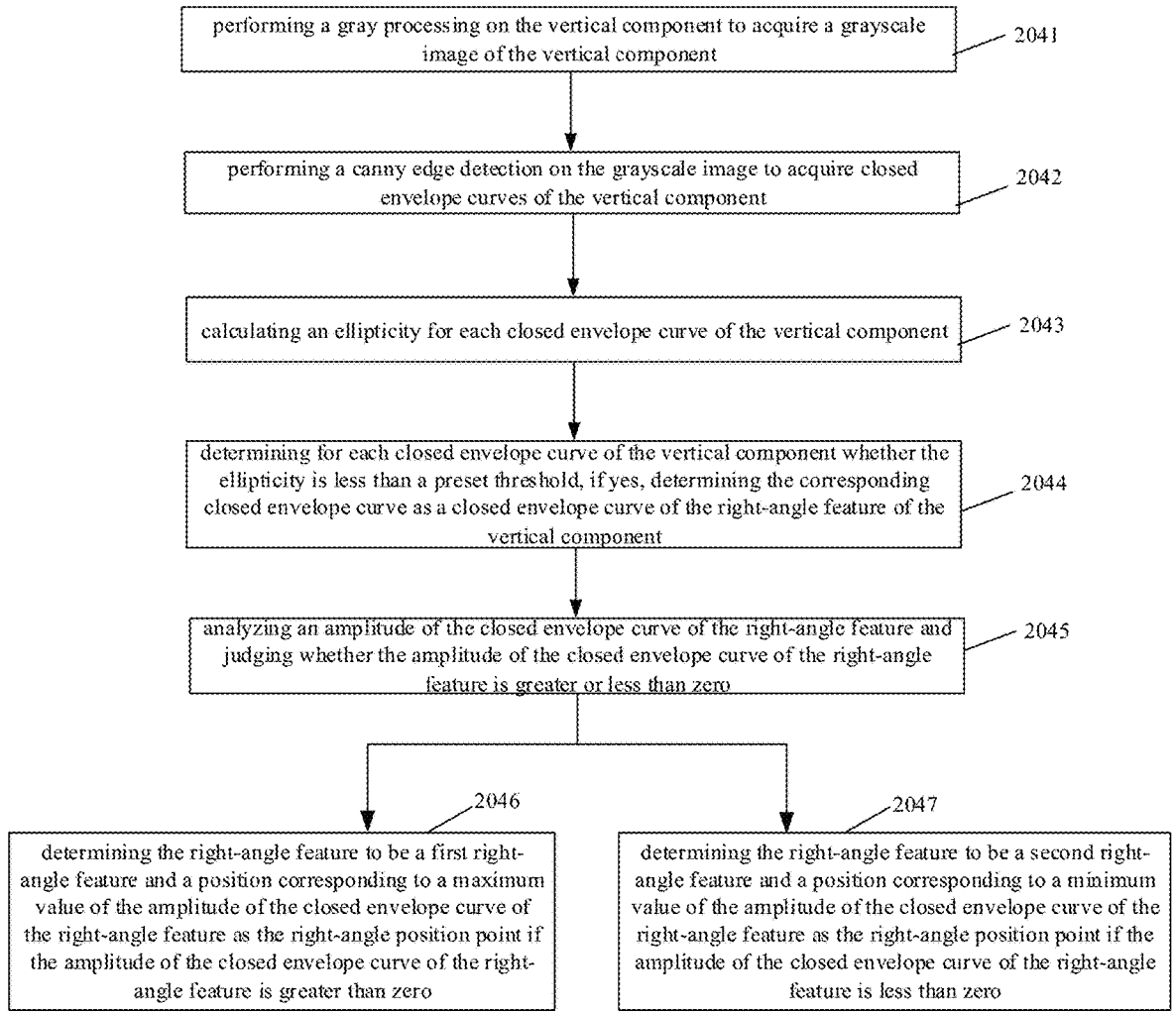
FIG. 12 is a flow chart of an operation illustrated at block 204 of FIG. 7 according to an embodiment of the present disclosure.

In an implementation, the operation at block 204 includes operations illustrated at the blocks of FIG. 12.

At block 2041, a gray processing is performed on the vertical component to acquire a grayscale image of the vertical component.

At block 2042, a canny edge detection is performed on the grayscale image to acquire closed envelope curves of the vertical component.

It should be noted that, through the gray-scale processing on the vertical component, a corresponding grayscale image is generated, then the closed envelope curves in the grayscale image can be identified quickly by the canny edge detection. For more details on the gray processing and the canny edge detection, reference can be made to the related art. Certainly, the closed envelope curve may be acquired by other means, which will not be limited herein.

At block 2043, an ellipticity is calculated for each closed envelope curve of the vertical component.

At block 2044, it is determined for each closed envelope curve of the vertical component whether the ellipticity is less than a preset threshold, if yes, the corresponding closed envelope curve is determined as the closed envelope curve of the right-angle feature of the vertical component.

At block 2045, an amplitude of the closed envelope curve of the right-angle feature is analyzed and it is judged whether the amplitude of the closed envelope curve of the right-angle feature is greater or less than zero.

At block 2046, if the amplitude of the closed envelope curve of the right-angle feature is greater than zero, the right-angle feature is determined to be a first right-angle feature and a position corresponding to a maximum value of the amplitude of the closed envelope curve of the right-angle feature is determined as the right-angle position point.

At block 2047, if the amplitude of the closed envelope curve of the right-angle feature is less than zero, the right-angle feature is determined to be a second right-angle feature and a position corresponding to a minimum value of the amplitude of the closed envelope curve of the right-angle feature is determined as the right-angle position point.

At block 205, all possible right-angle types at each right-angle position point of the defect are obtained according to the corresponding right-angle feature of the vertical component.

At block 206, all the possible right-angle types at each right-angle position point are traversed to determine respective optimal right-angle type at each right-angle position point.

At block 207, the defect opening profile is drawn according to the respective optimal right-angle type at each right-angle position point.

The implementations of the operations at blocks 205, 206 and 207 are same as the implementations of the operations at blocks 103, 104 and 105 as described above, which will not be elaborated herein.

Another example is given here to explain the method for identifying a defect opening profile where the automatic identification mode is used to identify the vertical component of the magnetic flux leakage signal.

Figure 13:
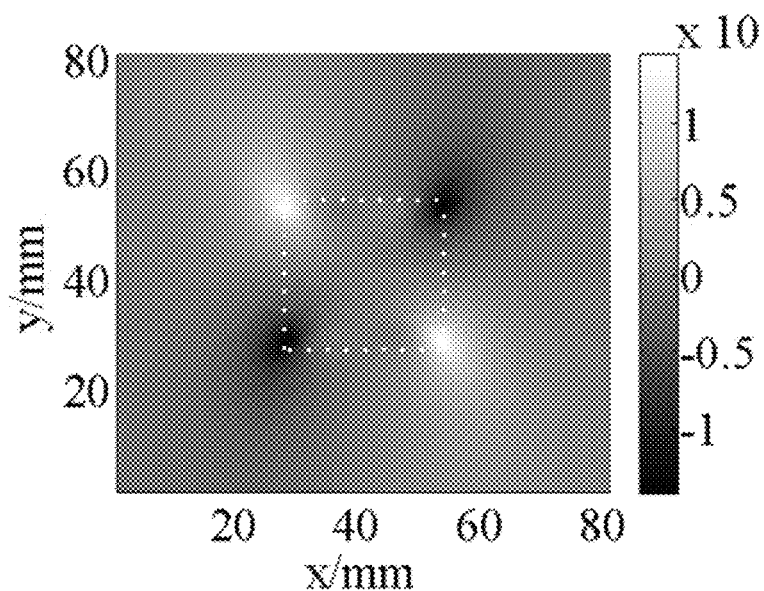
FIG. 13 is a schematic diagram showing a signal intensity distribution of a vertical component of a magnetic flux leakage signal of a defect in three-dimensional magnetic flux leakage testing according to an embodiment of the present disclosure.

FIG. 13 is a schematic diagram showing a signal intensity distribution of a vertical component of a magnetic flux leakage signal of another defect in exemplary three-dimensional magnetic flux leakage testing according to an embodiment of the present disclosure. The dotted line in FIG. 13 gives the original opening profile of the defect.

Figure 14:
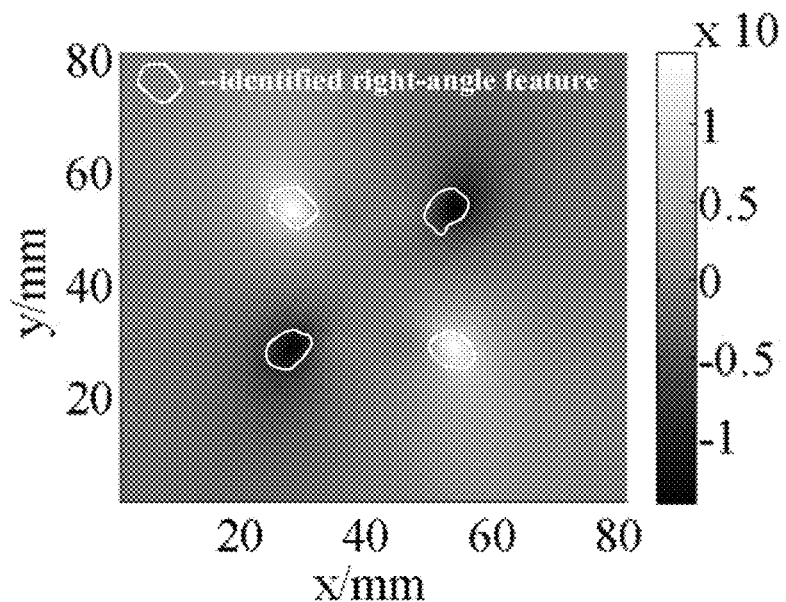
FIG. 14 is a schematic diagram showing identified right-angle features of a defect based on the artificial identification mode.
Figure 15:
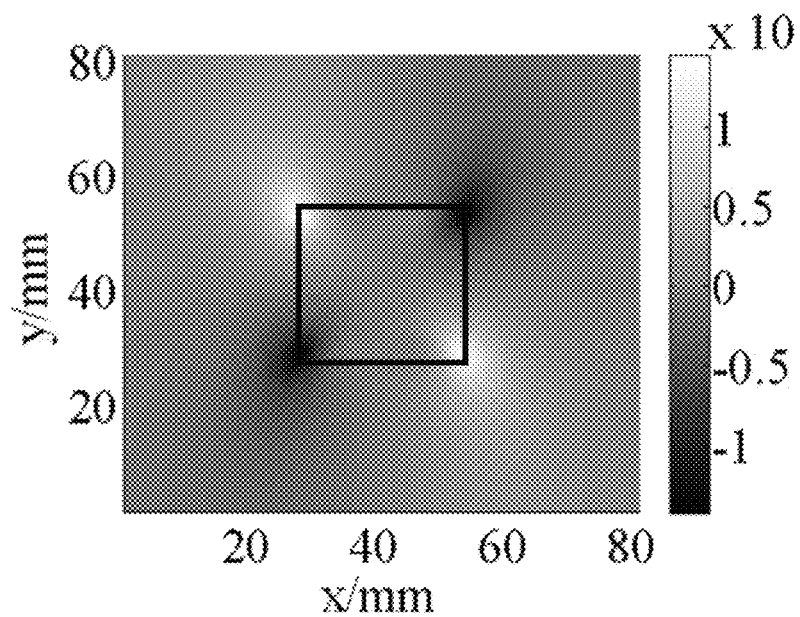
FIG. 15 is a schematic diagram showing an identification result of a defect according to an embodiment of the present disclosure.

FIG. 14 shows the identified right-angle features of the defect based on the automatic identification mode. The threshold here is preset to be 3.5. From the FIG. 14, it can be seen that four right-angle features of the vertical component of magnetic flux leakage signal of the other defect have been determined. FIG. 15 is a schematic diagram showing an identification result of the defect according to an embodiment of the present disclosure, where the automatic identification mode is used to identify the vertical component of the magnetic flux leakage signal. The solid line in FIG. 15 shows the identified opening profile of the other defect. As can be seen from FIG. 15, the method for identifying the defect opening profile based on the vertical component of the magnetic flux leakage signal also has a good identification effect.

With the method for identifying a defect opening profile according to embodiments of the present disclosure, the identification mode for identifying the vertical component can be selected from the artificial identification mode and the automatic identification mode. If the artificial identification mode is determined as the identification mode, the right-angle features and the right-angle position points of the defect are determined according to observation of the vertical component. If the automatic identification mode is determined as the identification mode, the right-angle features and the right-angle position points of the defect are determined according to closed envelope curves of the vertical component. With the method of the present disclosure, the defect opening profile identification is realized with good identification effect by performing calculation and analysis only on the vertical component of the magnetic flux leakage signal, determining the right-angle feature at each right-angle position point of the defect and traversing the geometric topological graph, etc. Moreover, the method of the present disclosure is simple and has a high identification rate for the right angles of the defect, and thus provides effective and accurate information on the right-angle features of the defect for the defect opening profile identification based on the three-dimensional magnetic flux leakage signal. In addition, the method allows different identification modes to be used according to different occasions, and thus has good versatility. For example, when the automatic identification mode cannot be used due to failure, the artificial identification mode may be chose. When there is no experienced technician on site, the automatic identification mode may be chose.

Figure 16:
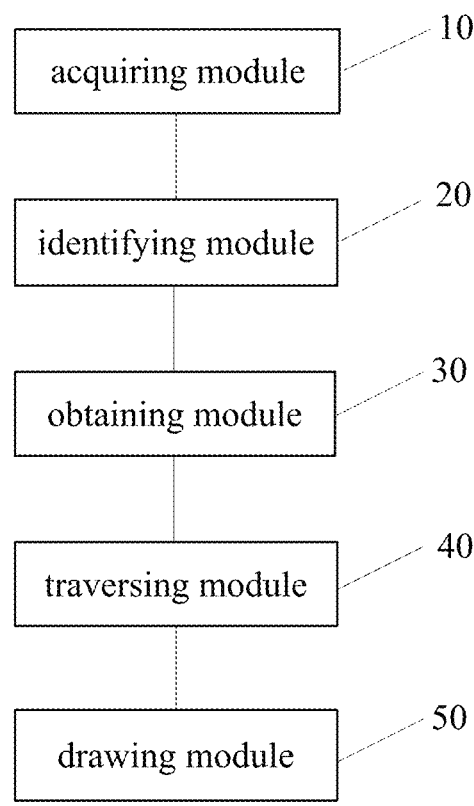
FIG. 16 is schematic block diagram of an apparatus for identifying a defect opening profile according to an embodiment of the present disclosure.
Figure 17A:
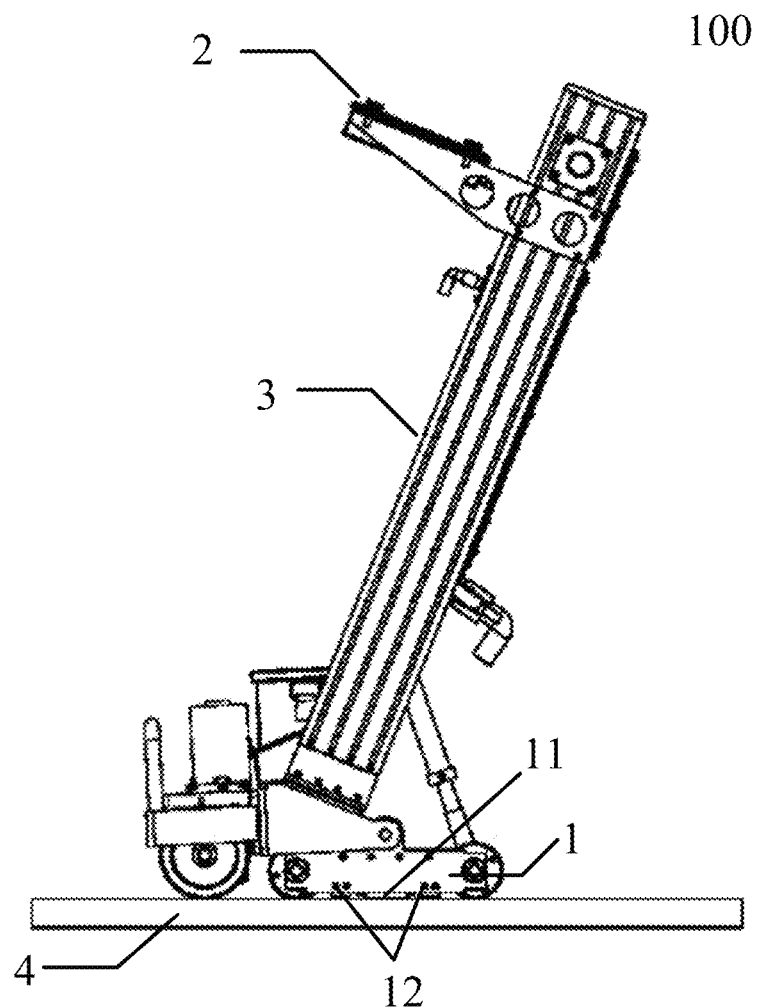
FIG. 17a is a front view of a magnetic flux leakage testing system containing a device for identifying a defect opening profile according to an embodiment of the present disclosure.
Figure 17B:
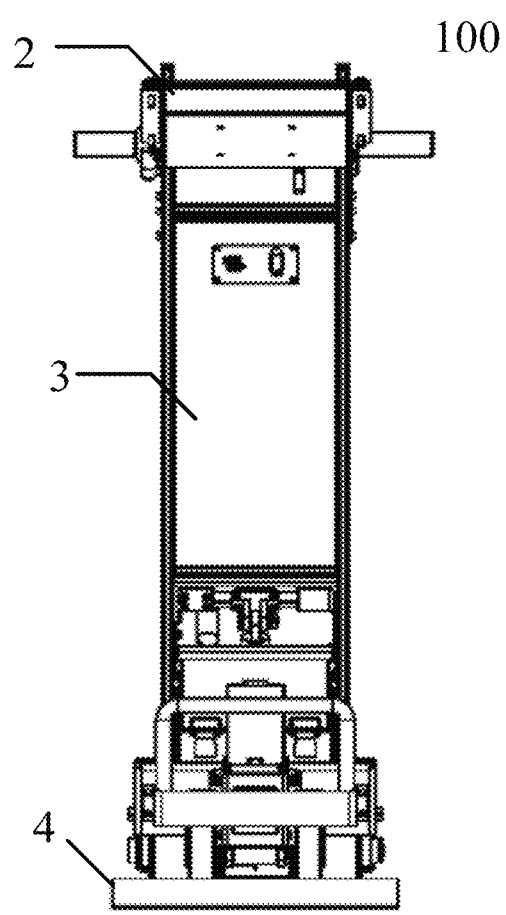
Figure 17C:
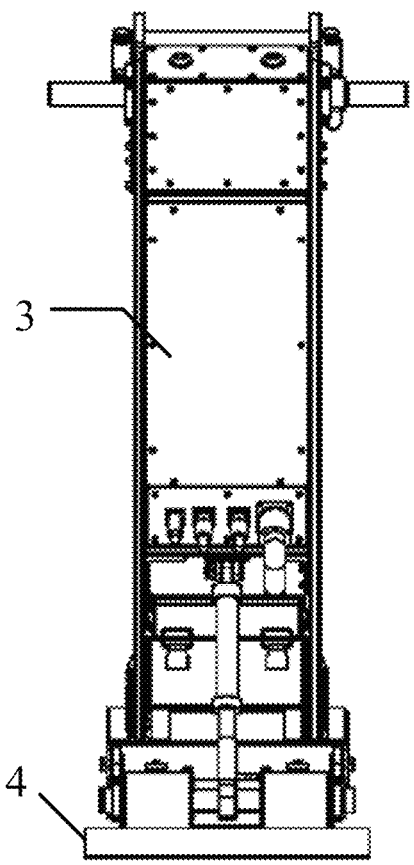
Figure 17D:
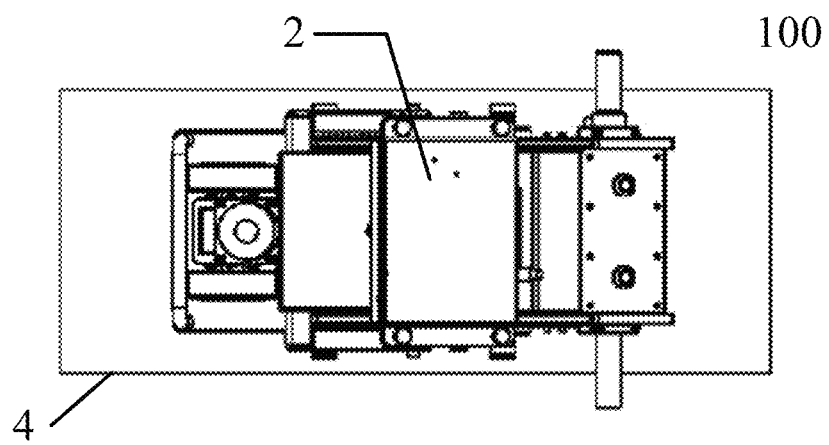

FIG. 16 is a schematic block diagram of an apparatus for identifying a defect opening profile according to an embodiment of the present disclosure. As shown in FIG. 16, the apparatus for identifying the defect opening profile includes: an acquiring module 10, an identifying module 20, an obtaining module 30, a traversing module 40, and a drawing module 50.

The acquiring module 10 is configured to acquire a vertical component of a magnetic flux leakage signal of a defect.

The identifying module 20 is configured to identify right-angle features and corresponding right-angle position points of the defect from the vertical component.

The obtaining module 30 is configured to obtain all possible right-angle types at each right-angle position point of the defect according to the corresponding right-angle feature of the vertical component.

The traversing module 40 is configured to traverse all the possible right-angle types at each right-angle position point to determine respective optimal right-angle type at each right-angle position point.

The drawing module 50 is configured to draw the defect opening profile according to the respective optimal right-angle type at each right-angle position point.

Further, the traversing module 40 is specifically configured to:

perform permutation and combination on the possible right-angle types at the right-angle position points;

establish geometric topological graphs of the defect according to results of the permutation and combination;

traverse all the geometric topological graphs;

select a geometric topological graph with a maximum closed area as an optimal geometric topological graph; and determine respective right-angle type at each right-angle position point of the optimal geometric topological graph as the respective optimal right-angle type at each right-angle position point of the defect.

With respect to the apparatus described in the above embodiments, the specific implementations of operations performed by individual modules therein have been described in detail in embodiments regarding the methods, which will not be elaborated herein.

With the apparatus for identifying a defect opening profile according to embodiments of the present disclosure, the vertical component of a magnetic flux leakage signal of a defect is acquired by the acquiring module 10; right-angle features and corresponding right-angle position points of the defect are determined from the vertical component by the identifying module 20; all possible right-angle types at each right-angle position point of the defect are obtained by the obtaining module 30 according to the corresponding right-angle feature of the vertical component; all the possible right-angle types at each right-angle position point are traversed by the traversing module 40 to determine respective optimal right-angle type at each right-angle position point; and the defect opening profile is drawn by the drawing module 50 according to the respective optimal right-angle type at each right-angle position point. With the apparatus of the present disclosure, the defect opening profile identification is realized with good identification effect by performing calculation and analysis only on the vertical component of the magnetic flux leakage signal, determining the right-angle feature at each right-angle position point of the defect and traversing the geometric topological graph, etc. Moreover, the apparatus of the present disclosure has a high identification rate for the right angles of the defect, and thus provides effective and accurate information on the right-angle features of the defect for defect opening profile identification based on the three-dimensional magnetic flux leakage signal.

In embodiments of the present disclosure, a device for identifying a defect opening profile is provided, the device includes: a processor; and a memory for storing instructions executable by the processor; in which the processor is configured to perform the method for identifying a defect opening profile as described above.

In embodiments of the present disclosure, there is provided a non-transitory computer-readable storage medium having stored therein instructions that, when executed by a processor of a terminal, causes the terminal to perform the method for identifying a defect opening profile as described above.

In embodiments of the present disclosure, there is provided a magnetic flux leakage testing system 100. As shown in FIGS. 17a-17d, the magnetic flux leakage testing system 100 includes a detecting unit 1, a display 2 and a device 3 for identifying a defect opening profile as described above. The detecting unit 1 includes a magnetic sensor array 11 and a magnetic pole 12. The magnetic pole includes a south pole (S) and a north pole (N) to create a magnetic field. The magnetic sensor array 11 includes a plurality of magnetic sensors, which are configured to detect a defect, such as a defect of a steel plate 4, and acquire magnetic flux leakage signals of the defect, as shown in FIGS. 2-3.

The magnetic flux leakage signals of the defect are transferred to the device 3 after acquired by the detecting unit 1. With the device 3 for identifying a defect opening profile, these magnetic flux leakage signals of the defect are analyzed so as to carry out the method for identifying a defect opening profile as described hereinbefore.

The display 2 is configured to display analysis results and the defect opening profile obtained by the device 3.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, the phrase of "a plurality of" means two or more than two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for identifying a defect opening profile with a magnetic flux leakage testing system, including a magnetic sensor array and a magnetic pole, the magnetic sensor array comprising a plurality of magnetic sensors, which are configured to detect the defect and acquire a magnetic flux leakage signal of the defect, comprising:

acquiring a vertical component of the magnetic flux leakage signal of the defect;

identifying right-angle features and corresponding right-angle position points of the defect from the vertical component, comprising:

determining the right-angle features and the right-angle position points of the defect according to closed envelope curves of the vertical component, wherein determining the right-angle features and the right-angle position points of the defect according to the closed envelope curves of the vertical component comprises:

acquiring a closed envelope curve of the right-angle feature of the vertical component;

analyzing an amplitude of the closed envelope curve of the right-angle feature and judging whether the amplitude of the closed envelope curve of the right-angle feature is greater or less than zero;

determining the right-angle feature to be a first right-angle feature and a position corresponding to a maximum value of the amplitude of the closed envelope curve of the right-angle feature as the right-angle position point if the amplitude of the closed envelope curve of the right-angle feature is greater than zero; and determining the right-angle feature to be a second right-angle feature and a position corresponding to a minimum value of the amplitude of the closed envelope curve of the right-angle feature as the right-angle position point if the amplitude of the closed envelope curve of the right-angle feature is less than zero;

obtaining all possible right-angle types at each of the right-angle position points of the defect according to the corresponding right-angle feature of the vertical component;

traversing all the possible right-angle types at each of the right-angle position points to determine a respective optimal right-angle type at each of the right-angle position points; and drawing the defect opening profile according to the respective optimal right-angle type at each of the right-angle position points.

2. The method according to claim 1, wherein traversing all the possible right-angle types at each of the right-angle position points to determine the respective optimal right-angle type at each of the right-angle position points comprises:

performing permutation and combination on the possible right-angle types at the right-angle position points;

establishing geometric topological graphs of the defect according to results of the permutation and combination;

traversing all the geometric topological graphs;

selecting a geometric topological graph with a maximum closed area as an optimal geometric topological graph; and determining a respective right-angle type at each of the right-angle position points of the optimal geometric topological graph as the respective optimal right-angle type at each of the right-angle position points of the defect.

3. The method according to claim 1, wherein the right-angle feature comprises a first right-angle feature and a second right-angle feature;

the first right-angle feature comprises four right-angle types having opening angles of from 0° to 90°, from 0° to 270°, from 180° to 270°, and from 180° to 90°, respectively; and the second right-angle feature comprises four right-angle types having opening angles of from 90° to 180°, from 270° to 360°, from 270° to 180°, and from 90° to 360°, respectively, wherein the opening angles are acquired by a clockwise rotation from a magnetization direction of the defect.

4. The method according to claim 1, wherein acquiring a closed envelope curve of the right-angle feature of the vertical component comprises:

performing a gray processing on the vertical component to acquire a grayscale image of the vertical component;

performing a canny edge detection on the grayscale image to acquire closed envelope curves of the vertical component;

calculating an ellipticity for each closed envelope curve of the vertical component;

determining for each closed envelope curve of the vertical component whether the ellipticity is less than a preset threshold, and when the ellipticity is less than the preset threshold, determining the corresponding closed envelope curve as the closed envelope curve of the right-angle feature of the vertical component, wherein the ellipticity is defined as a ratio of a major axis distance to a minor axis distance of the closed envelope curve.

5. The method according to claim 1, wherein the vertical component is a component of the magnetic flux leakage signal of the defect in a direction perpendicular to a magnetization direction on a detection plane, and the detection plane is a scan plane of a magnetic sensor array.

6. The method according to claim 2, wherein determining the right-angle features and the right-angle position points of the defect comprises:

performing a gray processing on the vertical component to acquire a grayscale image of the vertical component;

performing a canny edge detection on the grayscale image to acquire closed envelope curves of the vertical component;

calculating an ellipticity for each closed envelope curve of the vertical component;

determining for each closed envelope curve of the vertical component whether the ellipticity is less than a preset threshold, and when the ellipticity is less than the preset threshold, determining the corresponding closed envelope curve as a closed envelope curve of the right-angle feature of the vertical component;

analyzing an amplitude of the closed envelope curve of the right-angle feature and judging whether the amplitude of the closed envelope curve of the right-angle feature is greater or less than zero;

determining the right-angle feature to be a first right-angle feature and a position corresponding to a maximum value of the amplitude of the closed envelope curve of the right-angle feature as the right-angle position point if the amplitude of the closed envelope curve of the right-angle feature is greater than zero; and determining the right-angle feature to be a second right-angle feature and a position corresponding to a minimum value of the amplitude of the closed envelope curve of the right-angle feature as the right-angle position point if the amplitude of the closed envelope curve of the right-angle feature is less than zero, wherein the ellipticity is defined as a ratio of a major axis distance to a minor axis distance of the closed envelope curve.

7. A device for identifying a defect opening profile with a magnetic sensor array comprising a plurality of magnetic sensors, which are configured to detect the defect and acquire a magnetic flux leakage signal of the defect, the device comprising:

a processor; and a memory for storing instructions executable by the processor;

wherein the processor is configured to:

acquire a vertical component of the magnetic flux leakage signal of the defect;

identify right-angle features and corresponding right-angle position points of the defect from the vertical component by determining the right-angle features and the right-angle position points of the defect according to closed envelope curves of the vertical component, wherein the processor determines the right-angle features and the right-angle position points of the defect by:

acquiring a closed envelope curve of the right-angle feature of the vertical component;

analyzing an amplitude of the closed envelope curve of the right-angle feature and judging whether the amplitude of the closed envelope curve of the right-angle feature is greater or less than zero;

determining the right-angle feature to be a first right-angle feature and a position corresponding to a maximum value of the amplitude of the closed envelope curve of the right-angle feature as the right-angle position point if the amplitude of the closed envelope curve of the right-angle feature is greater than zero; and determining the right-angle feature to be a second right-angle feature and a position corresponding to a minimum value of the amplitude of the closed envelope curve of the right-angle feature as the right-angle position point if the amplitude of the closed envelope curve of the right-angle feature is less than zero;

obtain all possible right-angle types at each of the right-angle position points of the defect according to the corresponding right-angle feature of the vertical component;

traverse all the possible right-angle types at each of the right-angle position points to determine a respective optimal right-angle type at each of the right-angle position points; and draw the defect opening profile according to the respective optimal right-angle type at each of the right-angle position points.

8. The device according to claim 7, wherein traversing all the possible right-angle types at each of the right-angle position points to determine the respective optimal right-angle type at each of the right-angle position points comprises:

performing permutation and combination on the possible right-angle types at the right-angle position points;

establishing geometric topological graphs of the defect according to results of the permutation and combination;

traversing all the geometric topological graphs;

selecting a geometric topological graph with a maximum closed area as an optimal geometric topological graph; and determining a respective right-angle type at each of the right-angle position points of the optimal geometric topological graph as the respective optimal right-angle type at each of the right-angle position points of the defect.

9. The device according to claim 7, wherein the right-angle feature comprises a first right-angle feature and a second right-angle feature;

the first right-angle feature comprises four right-angle types having opening angles of from 0° to 90°, from 0° to 270°, from 180° to 270°, and from 180° to 90°, respectively; and the second right-angle feature comprises four right-angle types having opening angles of from 90° to 180°, from 270° to 360°, from 270° to 180°, and from 90° to 360°, respectively;

wherein the opening angles are acquired by a clockwise rotation from a magnetization direction of the defect.

10. The device according to claim 7, wherein acquiring a closed envelope curve of the right-angle feature of the vertical component comprises:

performing a gray processing on the vertical component to acquire a grayscale image of the vertical component;

performing a canny edge detection on the grayscale image to acquire closed envelope curves of the vertical component;

calculating an ellipticity for each closed envelope curve of the vertical component;

determining for each closed envelope curve of the vertical component whether the ellipticity is less than a preset threshold, and when the ellipticity is less than the preset threshold, determining the corresponding closed envelope curve as the closed envelope curve of the right-angle feature of the vertical component, wherein the ellipticity is defined as a ratio of a major axis distance to a minor axis distance of the closed envelope curve.

11. The device according to claim 7, wherein the vertical component is a component of the magnetic flux leakage signal of the defect in a direction perpendicular to a magnetization direction on a detection plane, and the detection plane is a scan plane of a magnetic sensor array.

12. A magnetic flux leakage testing system, comprising:

a detector comprising a magnetic sensor array and a magnetic pole, the magnetic sensor array comprising a plurality of magnetic sensors, which are configured to detect a defect and acquire a magnetic flux leakage signal of the defect; and a device for identifying a defect opening profile comprising:

a processor; and a memory for storing instructions executable by the processor;

wherein the processor is configured to:

receive the magnetic flux leakage signal of the defect;

acquire a vertical component of the magnetic flux leakage signal of the defect;

identify right-angle features and corresponding right-angle position points of the defect from the vertical component by determining the right-angle features and the right-angle position points of the defect according to closed envelope curves of the vertical component, wherein the processor determines the right-angle features and the right-angle position points of the defect by:

acquire a closed envelope curve of the right-angle feature of the vertical component;

analyze an amplitude of the closed envelope curve of the right-angle feature and judging whether the amplitude of the closed envelope curve of the right-angle feature is greater or less than zero;

determine the right-angle feature to be a first right-angle feature and a position corresponding to a maximum value of the amplitude of the closed envelope curve of the right-angle feature as the right-angle position point if the amplitude of the closed envelope curve of the right-angle feature is greater than zero; and determine the right-angle feature to be a second right-angle feature and a position corresponding to a minimum value of the amplitude of the closed envelope curve of the right-angle feature as the right-angle position point if the amplitude of the closed envelope curve of the right-angle feature is less than zero;

obtain all possible right-angle types at each of the right-angle position points of the defect according to the corresponding right-angle feature of the vertical component;

traverse all the possible right-angle types at each of the right-angle position points to determine a respective optimal right-angle type at each of the right-angle position points; and draw the defect opening profile according to the respective optimal right-angle type at each of the right-angle position points.

13. The system according to claim 12, wherein traversing all the possible right-angle types at each of the right-angle position points to determine the respective optimal right-angle type at each of the right-angle position points comprises:

performing permutation and combination on the possible right-angle types at the right-angle position points;

establishing geometric topological graphs of the defect according to results of the permutation and combination;

traversing all the geometric topological graphs;

selecting a geometric topological graph with a maximum closed area as an optimal geometric topological graph; and determining a respective right-angle type at each of the right-angle position points of the optimal geometric topological graph as the respective optimal right-angle type at each of the right-angle position points of the defect.

14. The system according to claim 12, wherein the right-angle feature comprises a first right-angle feature and a second right-angle feature;

the first right-angle feature comprises four right-angle types having opening angles of from 0° to 90°, from 0° to 270°, from 180° to 270°, and from 180° to 90°, respectively; and the second right-angle feature comprises four right-angle types having opening angles of from 90° to 180°, from 270° to 360°, from 270° to 180°, and from 90° to 360°, respectively;

wherein the opening angles are acquired by a clockwise rotation from a magnetization direction of the defect.

15. The system according to claim 12, wherein acquiring a closed envelope curve of the right-angle feature of the vertical component comprises:

performing a gray processing on the vertical component to acquire a grayscale image of the vertical component;

performing a canny edge detection on the grayscale image to acquire closed envelope curves of the vertical component;

calculating an ellipticity for each closed envelope curve of the vertical component;

determining for each closed envelope curve of the vertical component whether the ellipticity is less than a preset threshold, and when the ellipticity is less than the preset threshold, determining the corresponding closed envelope curve as the closed envelope curve of the right-angle feature of the vertical component, wherein the ellipticity is defined as a ratio of a major axis distance to a minor axis distance of the closed envelope curve.

16. The system according to claim 12, wherein the vertical component is a component of the magnetic flux leakage signal of the defect in a direction perpendicular to a magnetization direction on a detection plane, and the detection plane is a scan plane of a magnetic sensor array.

* * * * *